United States Patent [19]

Wilson et al.

[11] 4,350,911
[45] Sep. 21, 1982

[54] TANDEM CONNECTED SUBMERSIBLE OIL WELL PUMP MOTORS

[75] Inventors: Brown L. Wilson; Joseph T. Carle, both of Tulsa, Okla.

[73] Assignee: Oil Dynamics, Inc., Tulsa, Okla.

[21] Appl. No.: 45,312

[22] Filed: Jun. 4, 1979

[51] Int. Cl.³ .................... F04D 13/08; H02K 7/08
[52] U.S. Cl. ............................. 310/87; 310/90; 310/112; 417/365; 308/147
[58] Field of Search ............... 417/422, 424, 366, 369, 417/368, 372, 371, 360, 365; 310/87, 88, 112, 114, 90, 42; 308/135, 139, 163, 168, 147

[56] References Cited

U.S. PATENT DOCUMENTS

| | | | |
|---|---|---|---|
| 1,491,992 | 4/1924 | McCuen | 308/163 |
| 2,236,887 | 4/1941 | Arutunoff | 417/422 |
| 2,648,286 | 8/1953 | Bergh | 417/424 |
| 3,242,360 | 3/1966 | Carle | 417/424 |
| 3,255,367 | 6/1966 | Schaefer | 310/87 |
| 3,384,769 | 5/1968 | Schaefer | 310/87 |
| 3,404,924 | 10/1968 | Choate | 308/168 |

*Primary Examiner*—Richard E. Gluck
*Attorney, Agent, or Firm*—Head & Johnson

[57] ABSTRACT

Submersible electric motors for pumping fluid from wells are assembled together in tandem relationship for increasing total output horsepower. Means are provided to make electrical connections just prior to assembly and interconnect the oil flow corridors between motors during assembly. Precompressed spring-loaded thrust bearings compensate for shaft length changes and dampen vibrations. The oil circulation corridors include filtration.

20 Claims, 7 Drawing Figures

TANDEM CONNECTED SUBMERSIBLE OIL WELL PUMP MOTORS

BACKGROUND OF THE INVENTION

This invention relates to the field of submersible electric motors for pumping fluids from wells. In many instances it is desirable to be able to increase the total output horsepower of submersible motor-pump systems, which can be accomplished by assembling motors in tandem configuration. However, difficulties arise that are not ordinarily encountered when using a single enclosed submersible motor. During the assembly of the tandem motors, above ground, before being placed into the well, problems arise in making proper electrical interconnections between the two tandem motors and in the opening of and the interconnection of the oil flow channels between the two motors. To expose the motor oil to the atmosphere enhances the opportunity for contaminant material and/or loss of oil.

Each submersible motor contains an oil circulation path for lubrication and cooling purposes. When submersible motors are connected in tandem the oil comingles. Hence, failure of one motor will tend to degrade the other motor so that all will have to be replaced. This is often due to the failing motor tending to produce contaminating material, which is circulated through the oil flow channels and, thus will affect the operation of all the motors.

In addition, during in-the-well service, the longitudinal drive shaft expands, which thermal expansion is multiplied in tandem motor assemblies. This expansion places stresses upon the shaft and thrust bearings ordinarily used in submersible motor assemblies. Although the shafts are coupled by means that allow for expansion, rotary motion of the shaft does not permit sliding longitudinal movement within such couplings. Also, vibration problems exist which have not heretofore been encountered in a single motor assembly.

SUMMARY OF THE INVENTION

It is an object of this invention to provide a novel submersible motor assembly and means to make interconnections for tandem assembly prior to placement within a well. This is accomplished by providing an oil seal or valve located in the base of the upper tandem motor, which is normally closed until assembly connection is made and, thus the loss of motor oil and/or entrance of air and/or other contaminants in the upper motor is prevented. In addition, during above ground assembly and just prior to final assembly of the tandem motors, an electrical lead connection permits fast interconnection of the tandem motors.

The invention further provides a unique oil circulation path for the oil used in lubrication and cooling of the tandem motors that combines a filter and trap to prevent contaminants from passing from one motor to another.

The invention further has, as its object, to provide load-compensated thrust bearings capable of operating as the longitudinal motor shaft thermally expands, the change in length being absorbed in the compensated thrust bearings. The bearing is springloaded and precompressed to balance the weight of the shaft to assure the total load being divided between the thrust bearings of each of the tandemly arranged motors. Harmonic vibration is eliminated by a vibration dampener incorporated as a part of the load-compensated thrust bearing assembly.

DETAILED DESCRIPTION OF THE DRAWING

Before explaining the invention in detail, it is to be understood that the invention is not limited in its application to the details of construction and arrangement of parts illustrated in the accompanying drawing, since the invention is capable of other emodiments and of being practiced or carried out in a variety of ways. Also, it is to be understood that the phraseology or terminology employed herein is for purposes of description and not of limitation.

Figure 1A:
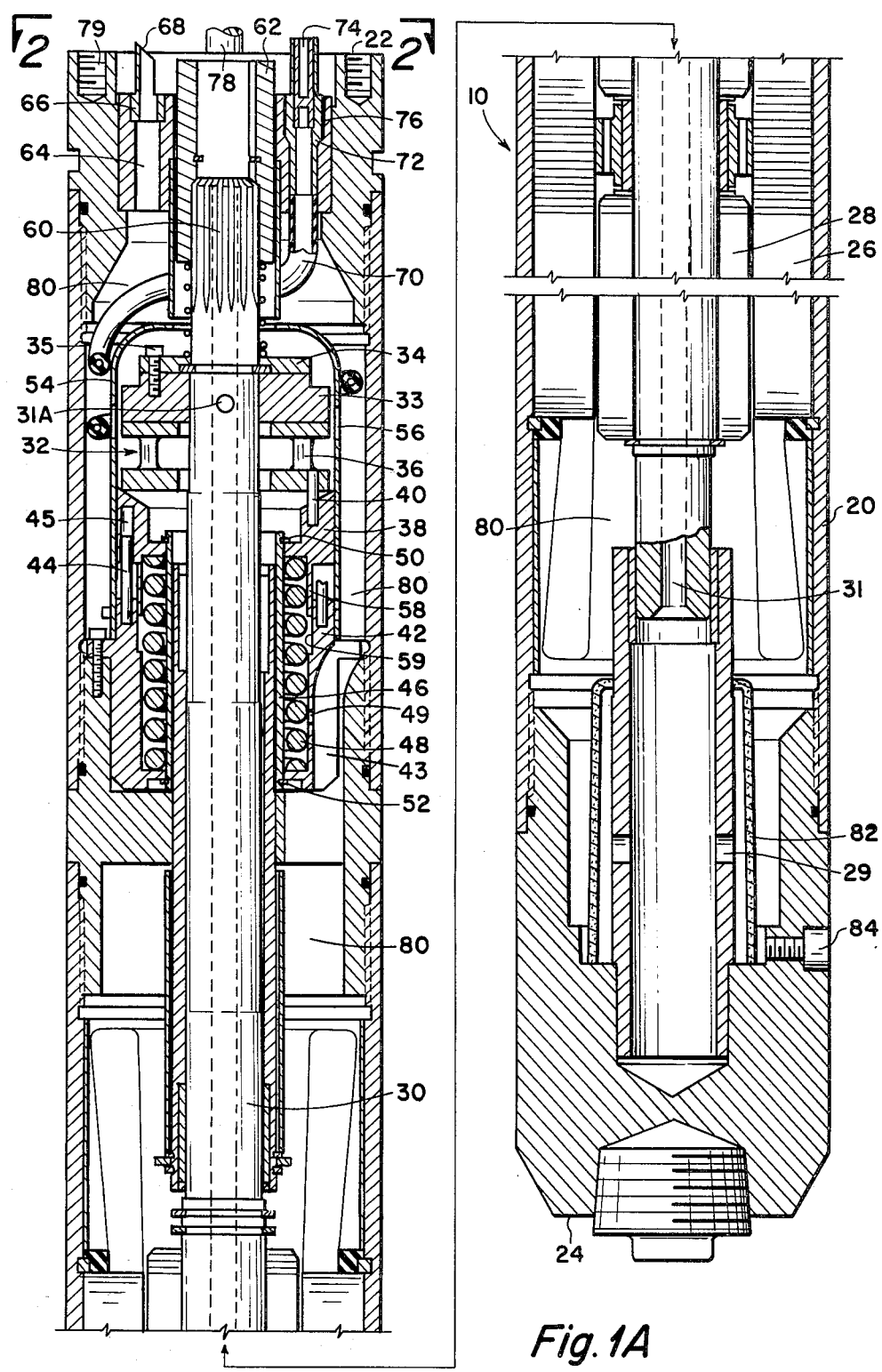
FIGS. 1A and 1B are composite divided views, partly in section, describing the lower and upper tandem motor designs, respectively.
Figure 1B:
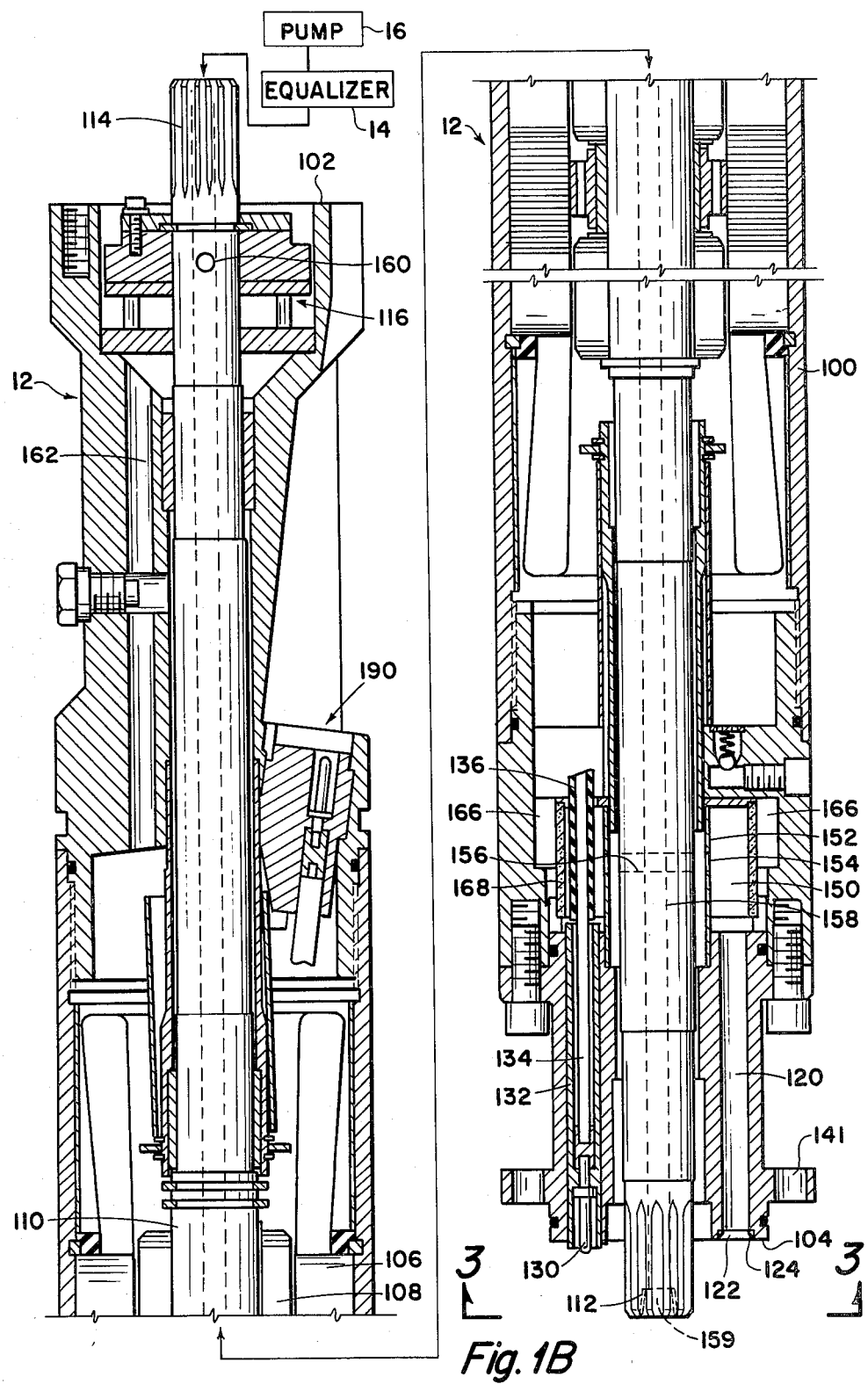
Figure 2:
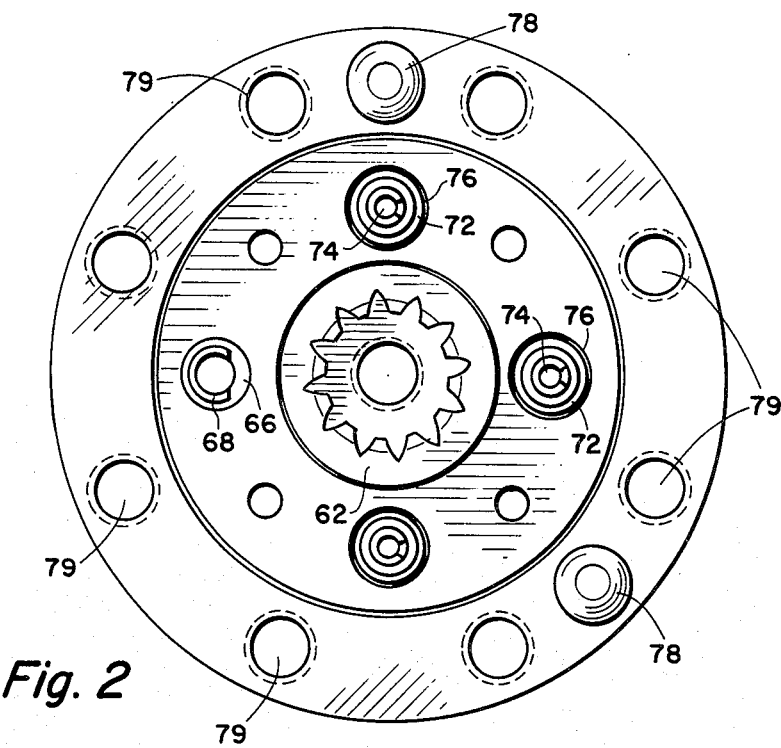
FIG. 2 is a top plan view taken along the line 2—2 of FIG. 1A.
Figure 3:
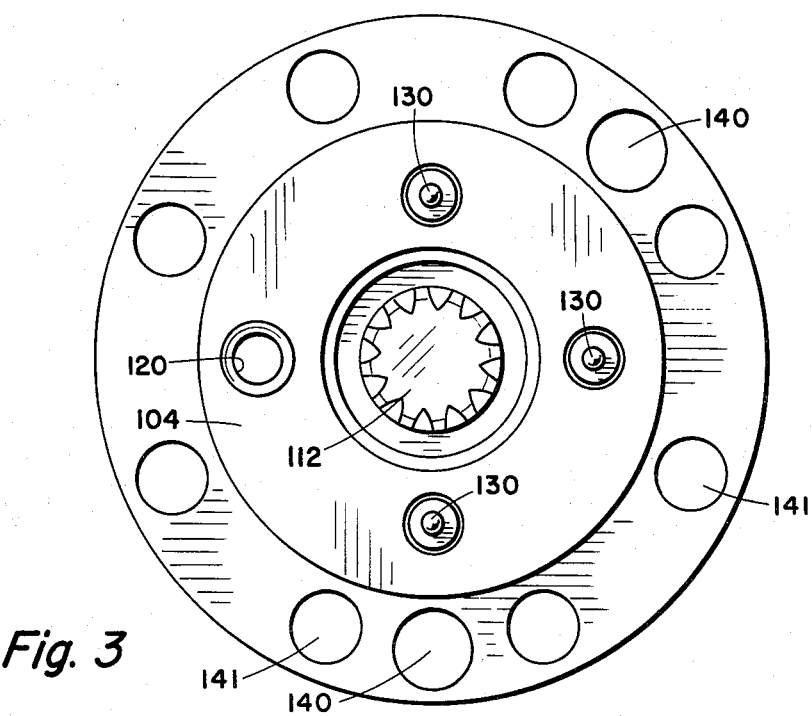
FIG. 3 is a bottom plan view taken along the line 3—3 of FIG. 1B.

Referring now to the drawings and, in particular to FIG. 1, the lower motor assembly is generally designated by the numeral 10 while the next upper motor assembly is generally designated by the numeral 12. Although two tandem motor assemblies are generally shown herein, the concepts of this invention are equally applicable to a plurality of motor assemblies. As is well-known in the art of submersible pumping of well fluids, the assembly will include, as schematically shown, some form of an equalizer 14 for equalizing the oil flow pressures and expansion created during the operation of the motor assembly and a pump 16 of the centrifugal type well-known in the art.

Referring now to the details of construction, the lower motor assembly 10 includes a longitudinal housing 20, having a top end 22 and a bottom end 24. Positioned and supported within the housing is an electric motor including winding 26 attached to the housing and the rotor-armature 28, which is keyed to the longitudinal shaft 30 that runs lengthwise of the housing 10. The shaft includes a hollow conduit in the shaft as a part of the oil circulation corridor within the housing as hereafter described. In addition to various coaxial bearings for supporting the rotation of the shaft, the shaft is essentially connected to and supported by a thrust bearing generally designated by the numeral 32 at the upper end of the lower motor assembly. This thrust bearing includes a disk 33 which is keyed to the longitudinal shaft 30 and held from longitudinal movement by a retainer 34 and one or more bolts 35. The disk is supported for rotational movement upon a bearing seat 36, which, in turn, is non-rotatably attached to a bearing sleeve 38 by interconnecting pins 40. The bearing sleeve 38 becomes a part of the system to absorb the longitudinal expansion and contraction of the shaft during operation. This system includes a spring housing 42 which is interconnected to the housing 10. The spring housing includes appropriate openings 43 for flow of oil. The spring housing 42 is interconnected to the bearing sleeve 38 by pins 44, which telescope within suitable openings 45 with the longitudinal movement of the bearing sleeve 38. A spring sleeve 46 is provided coaxial to the longitudinal shaft and defines an annular space between the sleeve 46 and the spring housing 42 for spring 48. An upper snap ring 50 and a lower snap ring 52 are provided as a means by which a spring 48 may be precompressed by moving bearing sleeve 38 against the spring housing 42 and there be locked into the desired precompression. A thrust bearing enclosure 54 has suitable openings 56 for the oil to flow in and out thereof. The bearing sleeve 38 includes a lower cylindrical skirt 58, which, by close tolerances, slides relative to surface 59 formed on the inner surface of spring housing 42 and, thus, provides a dampening action against vibration which may otherwise occur using a spring 48. Other dampening concepts, e.g., a small orifice 49 to control ingress and egress of oil may be provided in housing 42 is lieu of or along with the close tolerances.

The top end 22 of the lower motor housing 20 terminates by exposing the longitudinal shaft splines 60, to which a coupling assembly 62 is provided with similar splines for interconnection with the bottom end of the upper motor housing shaft. The upper end of the oil flow corridor terminates with channel 64 and channel opener 66 having a tapered cutting edge 68, which extends above the top end 22. An electrical lead 70 alternately connects to the motor and at the upper end of the housing is spirally wrapped about enclosure 54 and terminates in a receptacle 72, having a female portion 74 for interconnection with the male electrical connection at the bottom end of the upper motor housing. The receptacle 72 is positioned within a socket 76 and is removable therefrom such that during the assembly and prior to interconnect of the tandem motors the receptacle, along with lead 70, is pulled from the socket and positive interconnection made with the upper tandem motor male connector prior to assembly of the motors together. The top end of the lower motor housing includes alignment pins, usually two, which are so positioned relative to corresponding female openings at the bottom end of the upper motor housing such that misassembly is prevented. The lower motor housing 20 includes oil corridors 80, which comprise passageways through the motor in the various portions from the top to the bottom, ultimately interconnecting with the upper motor assembly housing via channel 64. At the bottom of the lower assembly is a sintered metal filter 82, which, during the circulation of oil will entrap particles which cannot enter the bearings or other portions of the motor and, thus, destroy same. A sampling plug 84 is provided at the bottom end of the lower motor housing to sample motor fluid for possible contamination trapped by the filter.

The upper motor assembly including a housing 100 having a top end 102 and a bottom end 104. An electric motor including winding 106 and a rotor-armature 108 are provided, the latter of which is keyed to power and rotate longitudinal shaft 110, which extends essentially the longitudinal length of the housing 100. The shaft includes the lower end which is adapted to be interconnected into coupling 62 of the lower motor assembly and an upper end spline 114 for interconnection with either an additional tandem motor equalizer or centrifugal pump. The shaft is supported by typical thrust bearings generally designated by the numeral 116 at the upper end.

The lower end of the upper housing 100 includes an oil channel 120, which interconnects with the typical oil flow corridors of the housing. The oil channel is closed prior to its interconnection, by a rupturable diaphragm 122.

At the bottom end 104 a male electrical terminal 130 is fixed in position by insulated material 132. Electrical lead 134 is attached to the electrical motor previously described by way of a flexible insulated conduit 136. Female openings 140 are provided at the lower end of the upper motor assembly for interconnection with the alignment pins extending above the top of the lower motor housing. The oil corridor of the upper housing extends from the lower end via channel 120 to a chamber defined by an inner oil flow space 150, thence to the opening 156, which interconnects with the coaxial channel 158 and upper opening 160 adjacent to thrust bearing 116, the lower end of channel 158 having a plug 159 to prevent oil circulation between the lower and upper shafts. The oil return flow channel 162 interconnects with outer oil flow space 166 formed as a part of the chamber. A cylindrical sintered filter element divides the inner and outer flow spaces.

Figure 6:
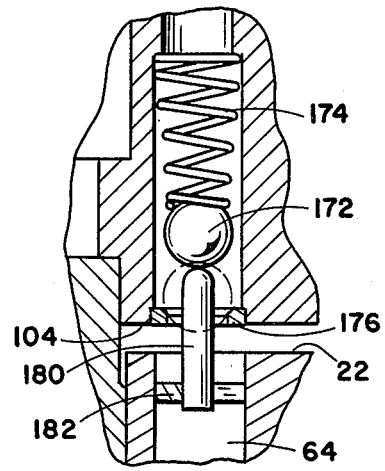
FIG. 6 is a partial sectional view of an alternate oil seal for use with this invention.

Referring now to FIG. 6, an alternate embodiment of the bottom end of the upper motor assembly includes a chamber closed by a ball valve 172, biased by spring 174. At the top end of the lower motor assembly as a part of channel a pin 180 is retained by spoke-like member 182 yet permits the passage of oil therethrough. Thus, when the upper and lower housings are assembled, pin 180 will unseat ball valve 172 to open and interconnect the oil flow corridors of the two housings, i.e. channels 64 and 120.

OPERATION

Figure 5:
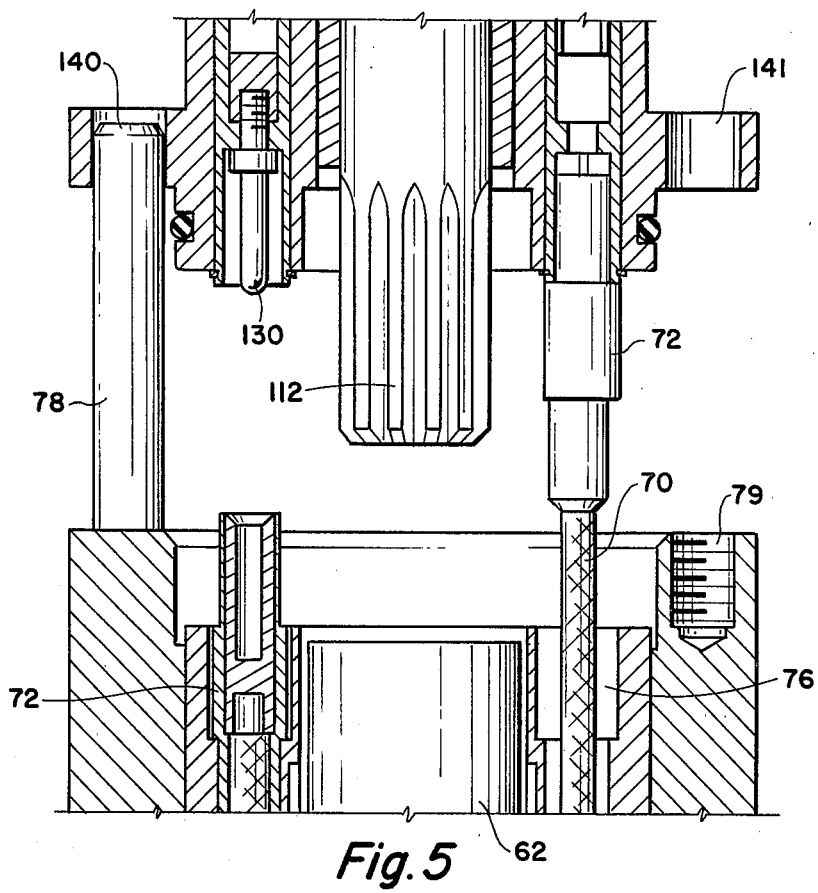
FIG. 5 is a partial sectional view showing the electrical interconnection.
Figure 4:
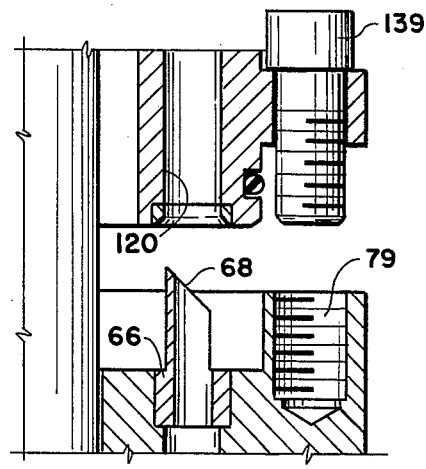
FIG. 4 is a partial sectional view showing the oil corridor interconnecting mechanism of this invention.

The lower and upper tandem motors, preassembled individually, are transported to the well location and normally assembled in a vertical position. The upper motor housing is lowered relative to the fixed lower motor housing and positioned such that the alignment pins 78 are inserted into the respective openings 140 at the bottom end of the upper motor housing (See FIG. 5). As such, there is sufficient room for an operator to grasp the top of receptacle 72, using pliers, for example, remove it from its socket and pull upwardly, making connection with the electrical terminal 130. The upper motor housing is lowered toward its final assembly position the receptacle 72 will ultimately re-reset in its socket 76. Just prior to assembly the tapered cutting edge 68 of the oil channel opener 66 strikes diaphragm 122 at the lower end of the upper housing. Further lowering movement acts to circumferentially cut the diaphragm except at one place which acts as a hinge point for the diaphragm. Further movement of the opener 66 will then position the hinged diaphragm in a space between the opener 66 and the oil channel 120, such that it will not interfere with the normal flow of oil and is trapped from any movement into the oil flow channels. Thereafter, the upper and lower housings are assembled together using bolts 139 through openings 141 into the threaded openings 79. Atop the upper motor housing the assembly may include an equalizer and, in any event, a pump. The assembly is then lowered into the well after making suitable electrical connection at the point of the upper motor housing generally designated 190, with a cable that runs the length of the well from the surface alongside the pumping unit and associated tubing.

In use, as the submersible motors warm up, the lubrication oil inside them expands. This increase in oil volume must be compensated for. This is usually accomplished by some sort of expansion compensating device (equalizer) 14 located generally on top of the motor. When motors are assembled in tandem the expansion oil must pass through each motor before reaching the equalizer. The flow path will be upwardly through lower shaft 30 passageway 31 from opening 29. Some oil circulates into the upper thrust bearing through the opening 31A. Oil continues upward into the shaft 110 of the upper housing and thence into an equalizer 14. The flow also occurs through the oil corridors outside the shaft. As the motors cool, the process is reversed, and the motor oil contracts back into the motors with the principal flow being in the oil corridors. This flow will cause the oil to carry particles and contaminating matter from one motor to another. If one motor is starting to fail, the other motors will be contaminated and degraded by the sludge and particles generated by the failing motor. Placing a filter 168 and 82 in the bottom of the respective upper and lower housings and arranging the flow paths so that the contaminants will be filtered from the return oil eliminates the contaminants from spreading to the other motors when the motors are running.

What is claimed is:

1. In a submersible motor assembly used to drive a pump for pumping fluids from wells having, tandemly arranged, a lower motor assembly and an upper motor assembly, each motor assembly having a longitudinal housing with top and bottom ends, an electric motor, rotor-driven longitudinal shaft, thrust bearings supporting the shaft, oil corridor means within the shaft, and housing to permit the circulation of oil contained within the housing caused by the rotation of the shaft, and internal electrical leads to the motor and splined connection for the shafts, the improvement characterized by:
   seal means closing the bottom end of the upper motor assembly oil corridor, and
   means, as the bottom end of the upper motor assembly is connected to the top end of the lower motor assembly, to open the seal and interconnect the corridor means.

2. The assembly of claim 1, the improvement further characterized by:
   the seal means comprising a frangible diaphragm, and
   the means to break the diaphragm comprising a conduit having a tapered cutting edge adapted to shear the diaphragm except at one point, bend the diaphragm at that point and secure the diaphragm in a space between the outside of the conduit and the walls of the upper oil corridor.

3. The assembly of claim 1, the improvement further characterized by:
   the seal means comprising a valve seat and a spring-loaded check valve normally seated on the valve seat, and
   the means to open the seal comprises a striker cooperating to move the valve off of the seat.

4. The assembly of claim 1, the further improvement characterized by:
   electrical connection means between the lower and upper motor assemblies comprising, at the top of the lower assembly, a socket, an insulated female receptacle, connected to the internal electrical lead, which is spirally wrapped inside the housing, the receptacle movable from the socket for initial connection with an insulated male terminal fixed at the bottom of the upper assembly just prior to connecting the motor assemblies, and positionable in the socket when connected.

5. The assemblies of Claims 1, 2, 3 or 4, the further improvement including:
   unsymmetrical male alignment pins extending upward above the top of lower motor assembly, and
   female alignment openings to receive the pins positioned about the lower end of the upper motor assembly.

6. The assembly of claims 1, 2, 3, or 4 the further improvement including:
   a chamber in the oil corridor adjacent the bottom of the upper motor assembly, surrounding the longitudinal shaft, a cylindrical filter element coaxial with the shaft positioned in the chamber and dividing same into an inner oil flow space and an outer oil flow space
   whereby oil will flow during expansion upward into the inner space, thence into and up the shaft, a portion of which flows into the outer oil flow space, while the remainder flows upward into an equalizer and during running of the motor and upon contraction when the motor is shut off, oil in the outer flow space flows into the chamber across the filter element into the inner oil flow space.

7. The assembly of claims 1, 2, 3, or 4, the further improvement in the thrust bearing of at least one of said motor assemblies comprising precompressed spring means to support the shaft in tension and to absorb expansion and contraction of the longitudinal shaft.

8. The assembly of claim 7, wherein the thrust bearings have a disk attached to the shaft for rotation upon a bearing, the improvement further characterized by
   a spring sleeve surrounding the shaft,
   a spring housing surrounding the sleeve defining an annulus,
   a bearing seat connected to the bearing
   means interconnecting the bearing seat and spring housing to prevent rotation yet be axially movable relative to each other between stops located on the sleeve, and
   a spring situated in the annulus, the spring pre-loaded to normally bias the spring housing and bearing seat away from each other.

9. The assembly of claim 8, the improvement further characterized in that the bearing seat includes a cylindrical bearing sleeve telescopic with an inner surface on the spring housing, and means to dampen vibration as the spring expands and contracts.

10. The assembly of claim 9, the improvement further characterized in the means to dampen comprises a close tolerance between the sliding sleeve and the inner surface on the spring housing to restrict the flow of oil therebetween.

11. The assembly of claim 9, the improvement further characterized in the means to dampen comprises an orifice in either the spring housing on the bearing seat to restrict the flow of oil in or out of the annulus.

12. In a submersible motor assembly used to drive a pump for pumping fluids from wells having, tandemly arranged, a lower motor assembly and an upper motor assembly, each motor assembly having a longitudinal housing with top and bottom ends, an electric motor, rotor-driven longitudinal shaft, thrust bearings supporting the shaft, oil corridor means within the shaft, and housing to permit the circulation of oil contained within the housing, and internal electrical leads to the motor and splined connection for the shafts, the improvement characterized by:
   a thrust bearing of at least one of said motor assemblies has a disk attached to the shaft for rotation upon a bearing, and further characterized by:
   a spring sleeve surrounding the shaft,
   a spring housing surrounding the sleeve defining an annulus,
   a bearing seat connected to the bearing spring housing to prevent rotation yet be axially movable relative to each other between stops located on the sleeve, and
   a spring situated in the annulus, the spring preloaded to normally bias the spring housing and bearing seat away from each other.

13. The assembly of claim 12, the improvement further characterized in that the bearing seat includes a cylindrical bearing sleeve telescopic with an inner surface on the spring housing, and means to dampen vibration as the spring extends and contracts.

14. The assembly of claim 13, the improvement further characterized in the means to dampen comprises a tolerance between the sliding sleeve and the inner surface on the spring housing to restrict the flow of oil therebetween.

15. The assembly of claim 13, the improvement further characterized in the means to dampen comprises an orifice in either the spring housing on the bearing seat to control the flow of oil in or out of the annulus.

16. The assembly of claim 4, the further improvement including:
   unsymmetrical male alignment pins extending upward above the top of lower motor assembly,
   female alignment openings to receive the pins positioned above the lower end of the upper motor assembly; and
   a chamber in the oil corridor adjacent the bottom of the upper motor assembly, surrounding the longitudinal shaft, a cylindrical filter element coaxial with the shaft positioned in the chamber and dividing same into an inner oil flow space and an outer oil flow space
   whereby oil will flow during expansion upward into the inner space, thence into and up the shaft, a portion of which flows into the outer oil flow space, while the remainder flows upward into an equalizer and during running of the motor and upon contraction when the motor is shut off, oil in the flow space flows into the chamber across the filter element into the inner oil flow space.

17. The assembly of claim 1, the further improvement including:
   unsymmetrical male alignment pins extending upward above the top of lower motor assembly;
   female alignment openings to receive the pins positioned about the lower end of the upper motor assembly; and
   a thrust bearing comprising precompressed spring means to support the shaft in tension and to absorb expansion and contraction of the longitudinal shaft.

18. The assembly of claim 1, the further improvement including:
   a chamber in the oil corridor adjacent the bottom of the upper motor assembly, surrounding the longitudinal shaft, a cylindrical filter element coaxial with the shaft positioned in the chamber and dividing same into an inner oil flow space and an outer oil flow space
   whereby oil will flow during expansion upward into the inner space, thence into and up the shaft, a portion of which flows into the outer oil flow space, while the remainder flows upward into an equalizer and during running of the motor and upon contraction when the motor is shut off, oil in the flow space flows into the chamber across the filter element into the inner oil flow space; and
   a thrust bearing comprising precompressed spring means to support the shaft in tension and to absorb expansion and contraction of the longitudinal shaft.

19. The assembly of claim 17 wherein the thrust bearings have a disc attached to the shaft for rotation upon a bearing, the improvement further characterized by
   a spring sleeve surrounding the shaft,
   a spring housing surrounding the sleeve defining an annulus,
   a bearing seat connected to the bearing
   means interconnecting the bearing seat and spring housing to prevent rotation yet be axially movable relative to each other between stops located on the sleeve, and
   a spring situated in the annulus, the spring preloaded to normally bias the spring housing and bearing seat away from each other.

20. The assembly of claim 18 wherein the thrust bearings have a disc attached to the shaft for rotation upon a bearing, the improvement further characterized by
   a spring sleeve surrounding the shaft,
   a spring housing surrounding the sleeve defining an annulus,
   a bearing seat connected to the bearing
   means interconnecting the bearing seat and spring housing to prevent rotation yet be axially movable relative to each other between stops located on the sleeve, and
   a spring situated in the annulus, the spring pre-loaded to normally bias the spring housing and bearing seat away from each other.

* * * * *